United States Patent [19]

Kato et al.

[11] Patent Number: 4,899,554
[45] Date of Patent: Feb. 13, 1990

[54] REFRIGERATOR WITH PLURAL STORAGE CHAMBERS

[75] Inventors: Isao Kato, Isesaki; Mamoru Sunaga, Ota, both of Japan

[73] Assignee: Sanden Corporation, Gumma, Japan

[21] Appl. No.: 142,710

[22] Filed: Jan. 11, 1988

[30] Foreign Application Priority Data

Jan. 8, 1987 [JP] Japan ............................... 62-1342[U]
Jan. 9, 1987 [JP] Japan ............................... 62-1078[U]

[51] Int. Cl.⁴ .............................................. F25D 13/02
[52] U.S. Cl. ....................................... 62/442; 62/252; 62/254
[58] Field of Search .................. 62/252, 251, 254, 442

[56] References Cited

U.S. PATENT DOCUMENTS

| | | |
|---|---|---|
| 2,490,413 | 12/1949 | Burtis .................................. 62/252 X |
| 2,862,369 | 12/1958 | Simons . |
| 3,027,732 | 4/1962 | Mann et al. ........................... 62/329 |
| 3,134,243 | 5/1964 | Hagen et al. . |
| 3,203,337 | 8/1965 | Beckwith . |
| 3,291,027 | 12/1966 | Beckwith . |
| 4,135,369 | 1/1979 | Allgeyer et al. ................... 62/252 X |
| 4,175,401 | 11/1979 | McManus . |
| 4,483,151 | 11/1984 | Fujioka et al. . |
| 4,633,677 | 1/1987 | Maehara . |
| 4,637,220 | 1/1987 | Sakano . |
| 4,676,073 | 6/1987 | Lawrence . |

FOREIGN PATENT DOCUMENTS

| | | | |
|---|---|---|---|
| 1261646 | 12/1960 | France ................................. 62/442 |
| 5188576 | 10/1975 | Japan . |
| 57-38253 | 3/1982 | Japan . |
| 2072822 | 10/1981 | United Kingdom .................. 62/329 |

*Primary Examiner*—Henry A. Bennet
*Attorney, Agent, or Firm*—Banner, Birch, McKie & Beckett

[57] ABSTRACT

A refrigerator for use on vehicles and having a storage chamber horizontally divided into a plurality of spaces by shelves, each of which is preferably adjustable to provide for adjustment of the spaces. An air passage means is defined in the refrigerator to form a closed air circulation passage in each of the spaces with refrigerating means associated with each air circulation passage whereby the temperature in each of the spaces can be independently control.

26 Claims, 7 Drawing Sheets

REFRIGERATOR WITH PLURAL STORAGE CHAMBERS

BACKGROUND OF THE INVENTION

This invention relates to a refrigerator, and more particularly, to a refrigerator provided with a plurality of storage chambers with the temperature of each chamber controlled independently.

Refrigerators adapted to be carried on a vehicle such as a truck for transporting small parcels or packages of refrigerated or frozen merchandise generally are not available. These parcels or packages are now normally transported by refrigerated vehicles designed for handling large quantities of refrigerated or frozen merchandise, or in insulated packages with cooling media, which is suitable primarily for use for short distances. Local delivery of parcels or packages containing refrigerated or frozen merchandise would also normally require special vehicles with refrigerating means.

Foodstuffs have predetermined temperatures at which they should be stored to preserve their freshness, i.e., storing conditions for foodstuffs normally fall within three temperature ranges, such as frozen (stored under $-18°$ C.), chilled (stored under $0°$ C.$\pm 2°$ C.) and refrigerated ($5°$ C.$\pm 2°$ C.). Small parcels or packages containing refrigerated or frozen merchandise which may be shipped in a distribution system may have different kinds of merchandise, and may be irregularly shaped. Therefore, when these parcels and packages are shipped, vehicles with refrigerator or freezer means that are presently being used to deliver and collect them are relatively ineffective and economically inefficient. Because the refrigerator or freezer means has a fixed configuration, particularly with respect to the chambers for storing the merchandise, the vehicles cannot readily accommodate varying quantities of different kinds of merchandise.

SUMMARY OF THE INVENTION

It is a primary object of this invention to provide a refrigerator having a plurality of storage chambers to be maintained at different temperatures and in which the storing area of each chamber is adapted to be changed.

It is another object of this invention to provide such a refrigerator with plural storage chambers that are simple in construction.

A refrigerator in accordance with this invention comprises a cabinet with a storage chamber having a front opening. The storage chamber is horizontally divided into at least two spaces by shelves and the front opening is normally closed by a hinged door. A refrigerator means is disposed in the cabinet. An air passage means is defined in the cabinet to form closed air circulation paths in each of the spaces to refrigerate the space by the refrigerating means.

Further objects, features and other aspects of this invention will be understood from the following detailed description of the preferred embodiments of this invention referring to the attached drawings.

DETAILED DESCRIPTION OF THE PREFERRED EMBODIMENTS

Figure 1:
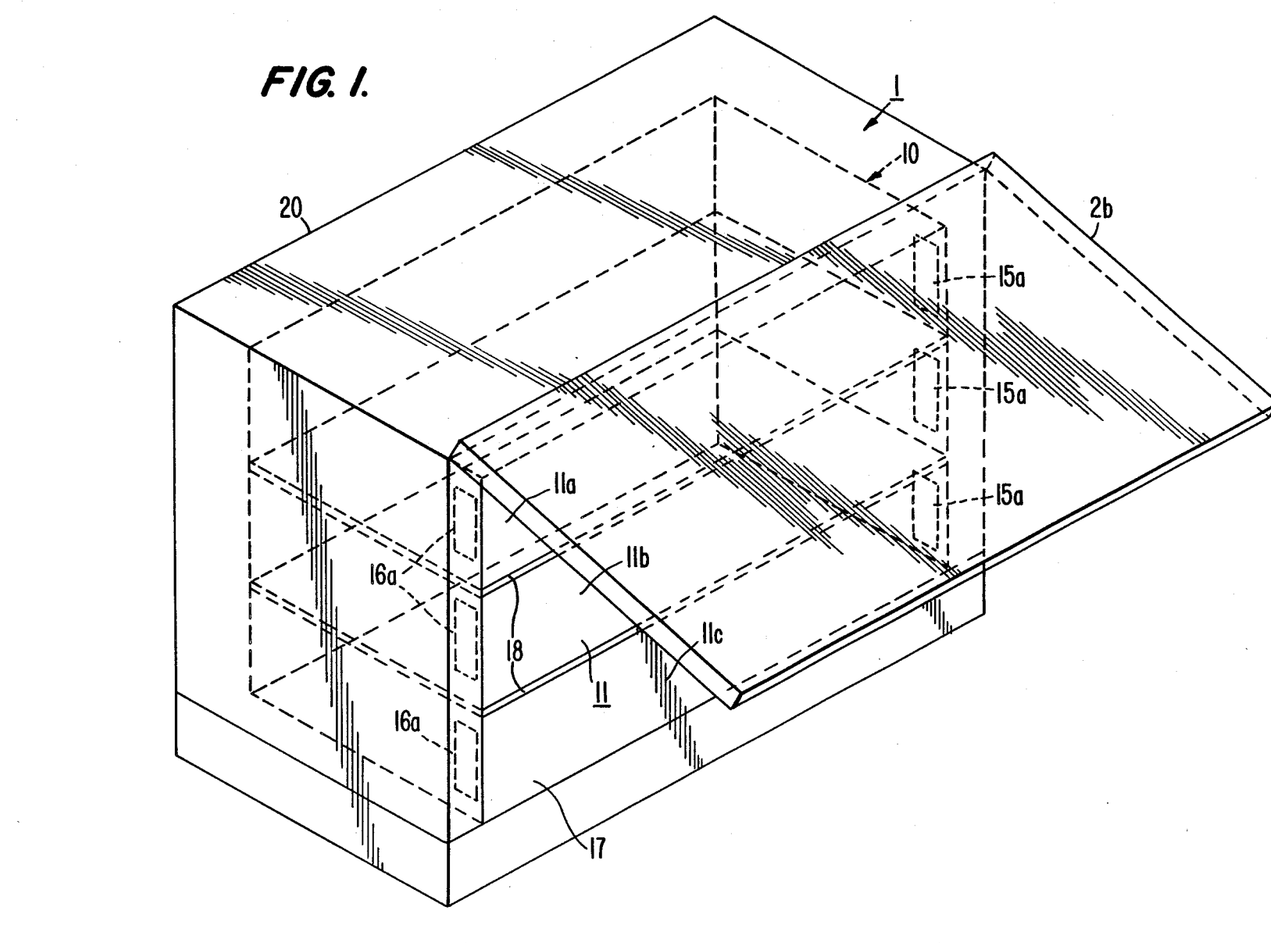
FIG. 1 is a diagrammatic perspective view of a refrigerator in accordance with one embodiment of this invention.
Figure 2:
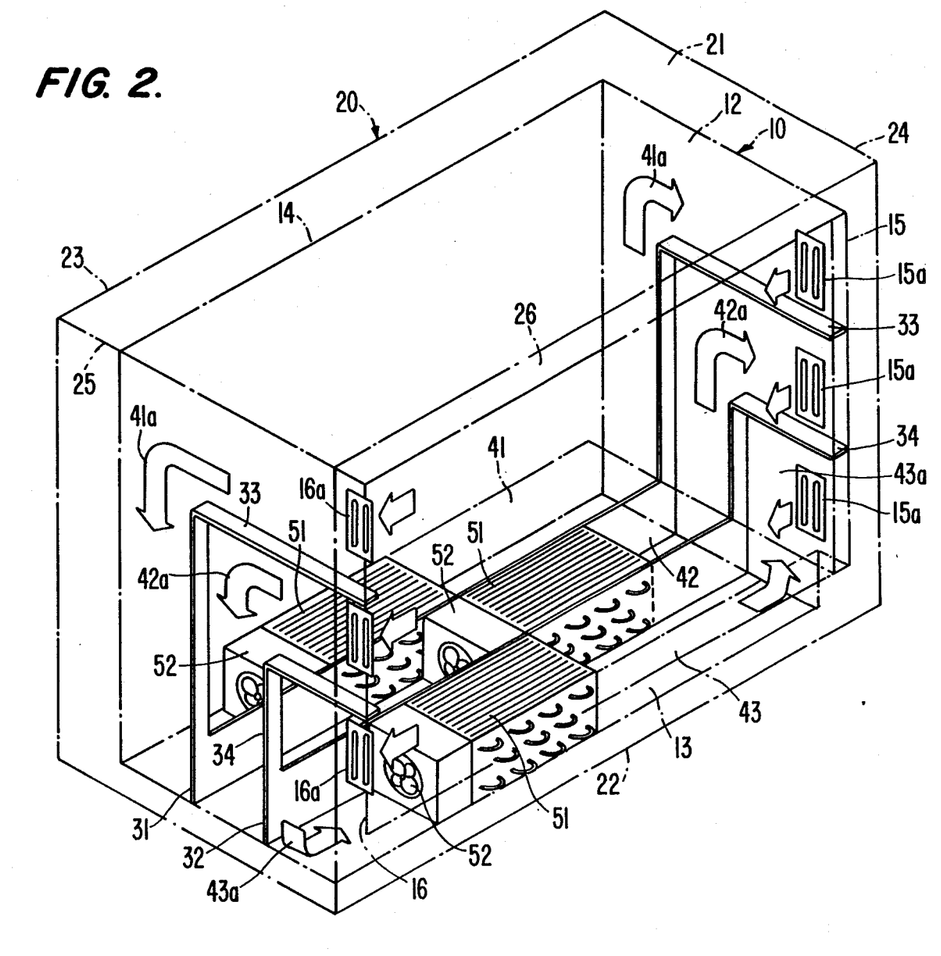
FIG. 2 is a diagrammatic perspective view illustrating the position of the refrigerating unit and air flow passages utilized in the refrigerator of FIG. 1.

Referring to FIGS. 1 and 2, there is illustrated a refrigerator in accordance with one embodiment of this invention. The refrigerator 1, which is designed for use on a vehicle for transporting refrigerated or frozen articles, comprises an interior cabinet 10 with a storage chamber 11 and an exterior cabinet 20. Interior cabinet 10 is defined by an upper panel 12, a bottom panel 13 and a rear panel 14 extending upwardly between the upper and bottom panels 12, 13. Storage chamber 11 is bounded on the sides by a pair of side panels 15, 16. Storage chamber 11 has a front opening 17 for loading and unloading merchandise and closed by a hinged door 26. Storage chamber 11 is also divided horizontally into a plurality of spaces 11a, 11b, 11c by shelves 18 which are mounted, preferably adjustably, in the interior cabinet 10.

The exterior cabinet 20 of the refrigerator 1 is defined by a top member 21, a bottom member 22, a vertical rear member 23 and a pair of side members 24, 25 each of which may be formed of an insulation material. The space between the panels of the interior cabinet 10 and the exterior cabinet 20 forms a plurality of air flow passages in which a refrigerating means is disposed.

As shown in FIG. 2, a plurality of air inlet holes 15a and outlet holes 16a are formed on the side panels 15, 16 respectively. Each of the outlet holes 16a is aligned with the corresponding inlet hole 15a on the opposed panel to define an air curtain across the front opening 17. The space formed between bottom panel 13 and bottom member 22 is divided by two partition plates 31, 32 to form three passages or conduits 41, 42, 43. An evaporator 51 and a fan 52 are disposed in each of the conduits 41, 42, 43. The evaporators 51 are parallel connected with one another and also serially connected with the other components of a refrigerating means, such as the compressor and condenser (not shown) which are carried by the vehicle. In this embodiment, the amount of the air flow through each of the conduits 41, 42, 43 can be controlled by operation of the fan 52, or the amount of the refrigerant in each evaporator 51 may be independently controlled by a suitable control means, to control the temperature of the air passed through the conduits 41, 42, 43. Thereby, each of the spaces 11a, 11b, 11c of the storage chamber 11 can be maintained at a different temperature.

The space between the side panels 15, 16 and the side members 24, 25 is divided by two separator plates 33, 34 each of which is connected with the terminal end of partition plate 31, 32 respectively, to form three air flow passages 41a, 42a, 43a. That is, each separator plate 33, 34 is formed L-shaped in cross-section to interconnect the inlet and outlet holes 15a, 16a and one end opening of the conduit 41, 42, 43 respectively. Therefore, air in each of the spaces 11a, 11b, 11c of the storage chamber 11 is introduced into the respective conduit 41, 42, 43 through an outlet hole 16a and discharged into the space 11a, 11b, 11c from the conduit 41, 42, 43 through an inlet hole 15a. Air discharged from the inlet hole 15a moves across the front opening 17 and is introduced into the air passage 41a, 42a, 43a through the outlet hole 16a to form an air curtain that prevents the incursion of warm air through the front opening 17 of the storage chamber 11 when the hinged door 27 is open.

In operation, when the hinged door 26 is closed to close the front opening 17 of the apparatus 1, the storage chamber 11 is isolated from the atmosphere and can be effectively refrigerated. At that time, each of the spaces 11a, 11b, 11c is isolated individually from one another by the shelves 18 and the door 26, and is interconnected with a respective one of the conduits 41, 42, 43 through the inlet and outlet holes 15a and 16a on the side panels 15, 16. Therefore, air in each of the spaces 11a, 11b, 11c is passed through the respective conduit 41, 42, 43 by an air flow passage 41a, 42a or 43a. Air passed through the conduits 41, 42, 43 is refrigerated and returned into the spaces 11a, 11b, 11c. By controlling the temperature in each of the conduits 41, 42, 43 each of the spaces 11a, 11b, 11c can be maintained at a different temperature in accordance with the requirements of the merchandise stored in that space.

Figure 3:
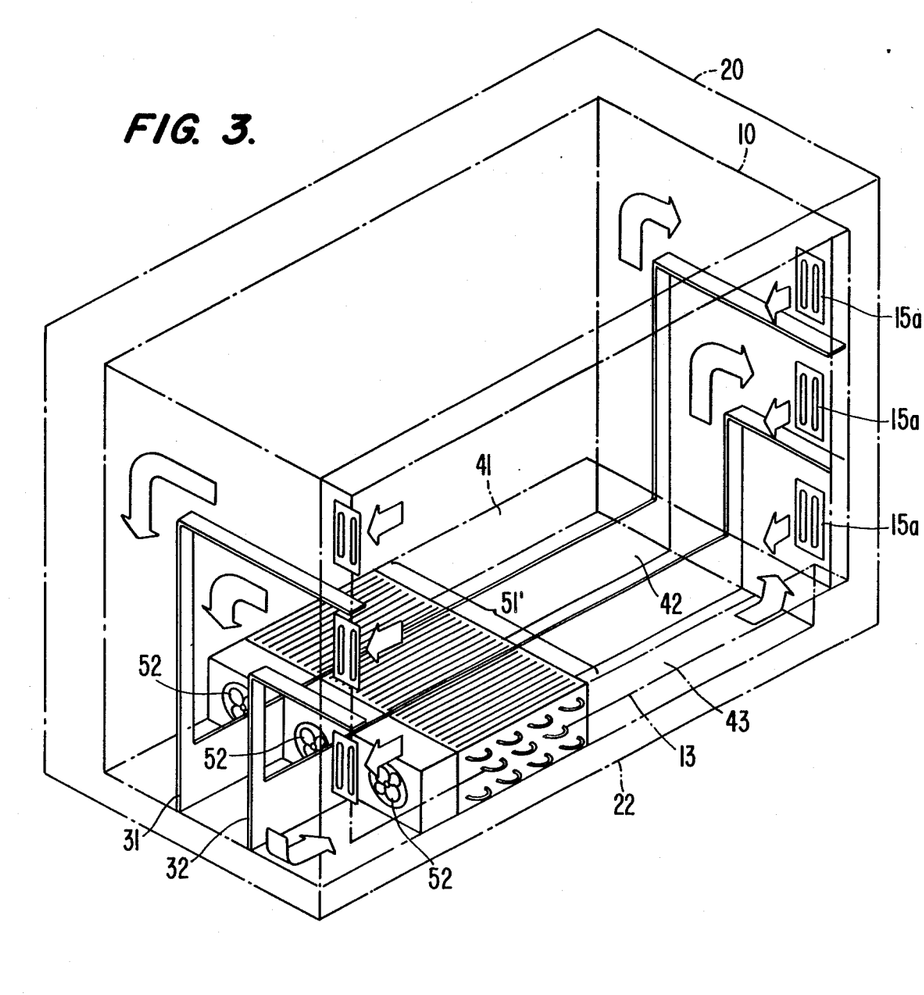
FIGS. 3–5 are diagrammatic perspective views of modified embodiments of the refrigerating unit of FIGS. 1 and 2.
Figure 4:
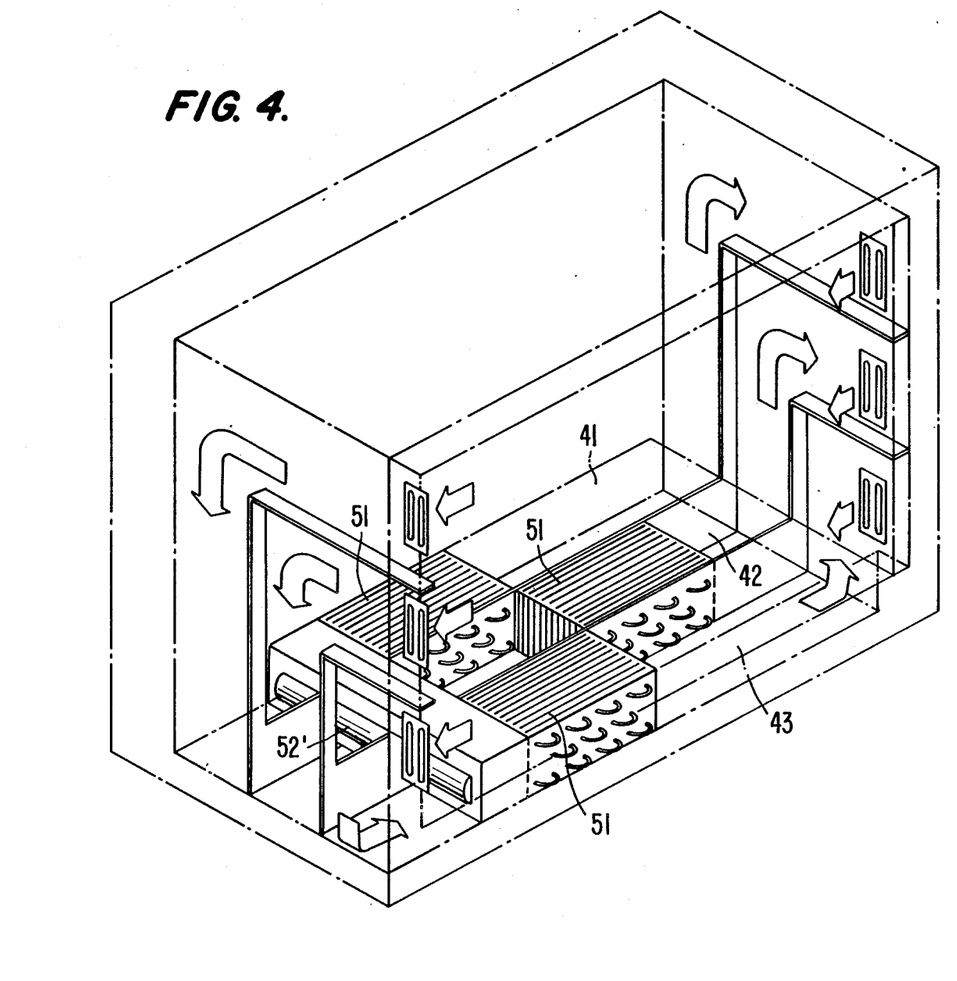

Referring to FIG. 3, the evaporator disposed in each of the conduits 41, 42, 43 may be formed as one common unit 51', and control of the air temperature can be accomplished by controlling the amount of the air flowing through the conduits 41, 42, 43. Control of the amount of the air flowing in each of the conduits 41, 42, 43 is achieved by controlling the operation of the fan 52 which is disposed respectively in the conduits 41, 42, 43. Alternatively, as shown in FIG. 4, the fans may be formed as one common unit 52' that extends across the conduits 41, 42, 43 and an evaporator 51 is disposed in each of the conduits 41, 42, 43. In this construction control of the air temperature in each of the spaces 11a, 11b, 11c is accomplished by controlling the amount of the refrigerant flowing through each evaporator 51.

Figure 5:
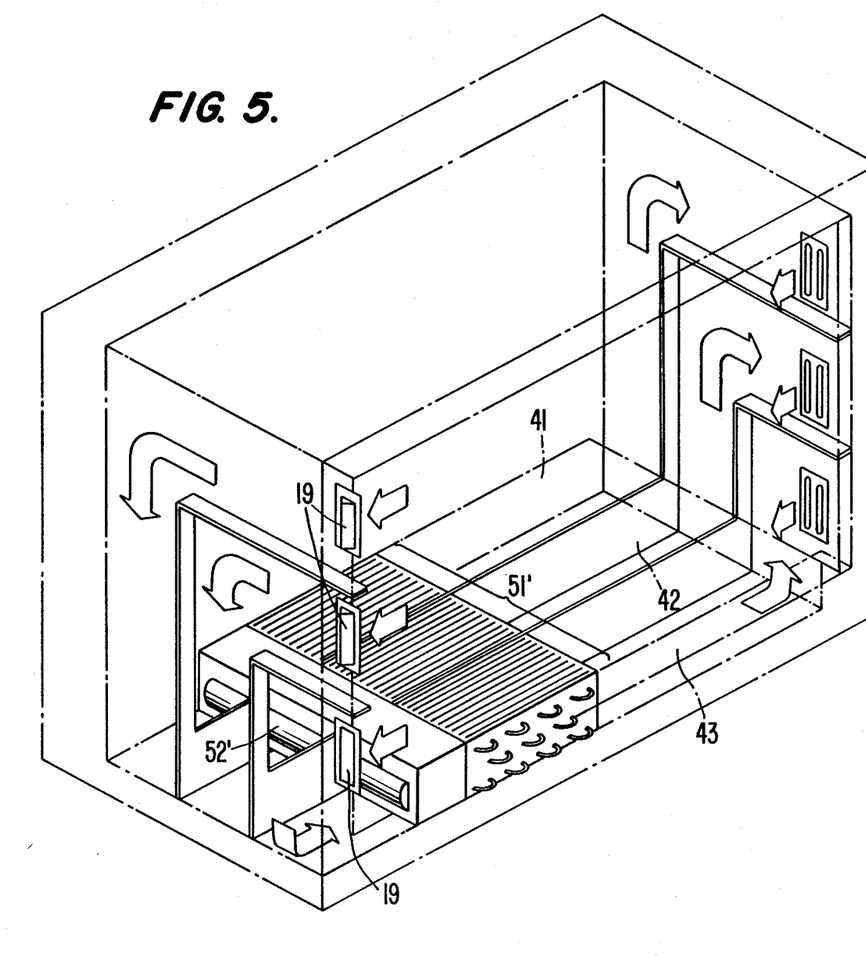

As shown in FIG. 5, the evaporator 51' and the fan 52' can be both formed as common units, and control of the air temperature in each of the spaces 11a, 11b, 11c can be accomplished by controlling the opening at the inlet and outlet holes 15a, 16a by a damper 19 rotatably disposed in the holes 15a, and/or 16a.

Figure 6:
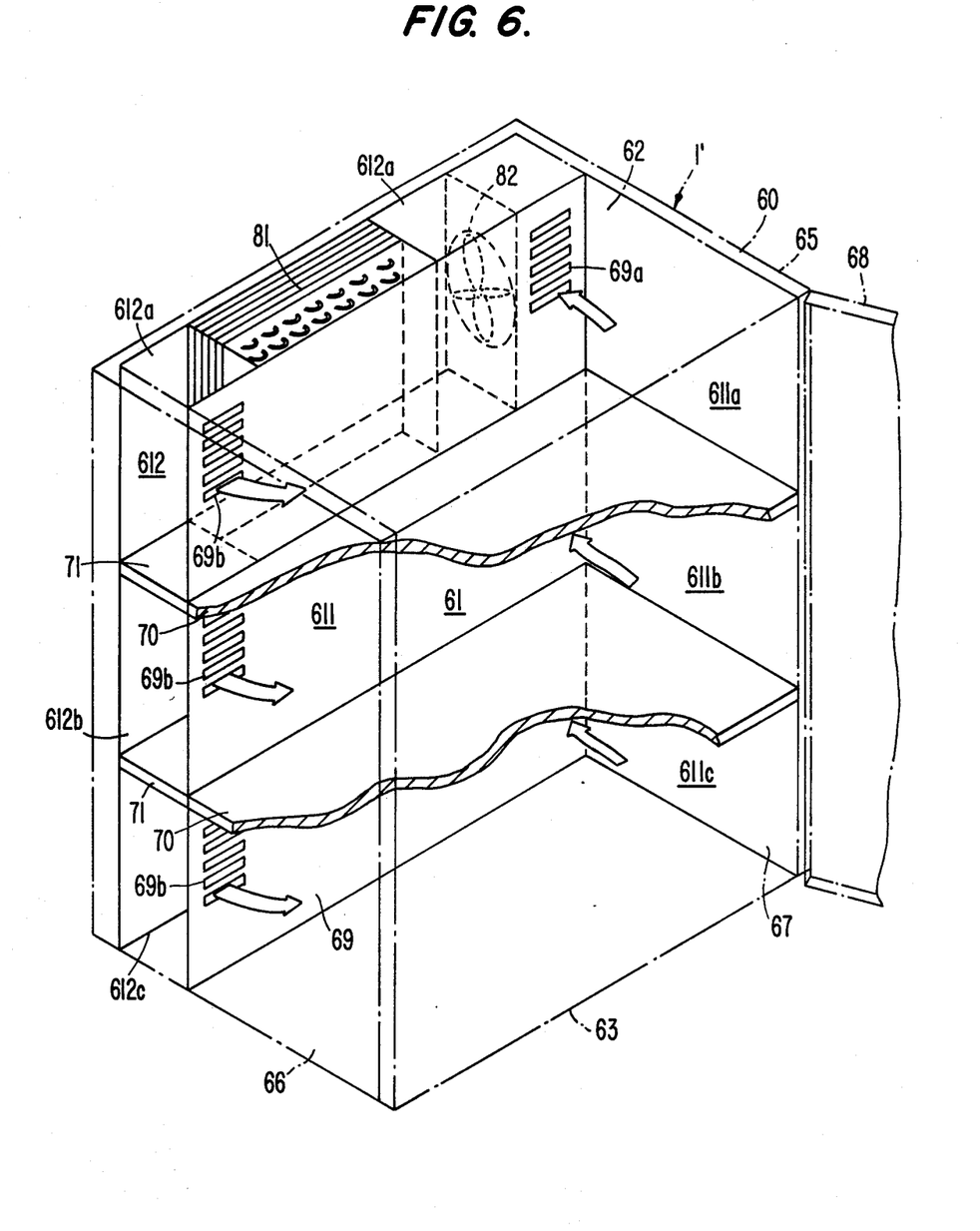
FIG. 6 is a diagrammatic perspective view of a refrigerator in accordance with another embodiment of this invention.
Figure 7:
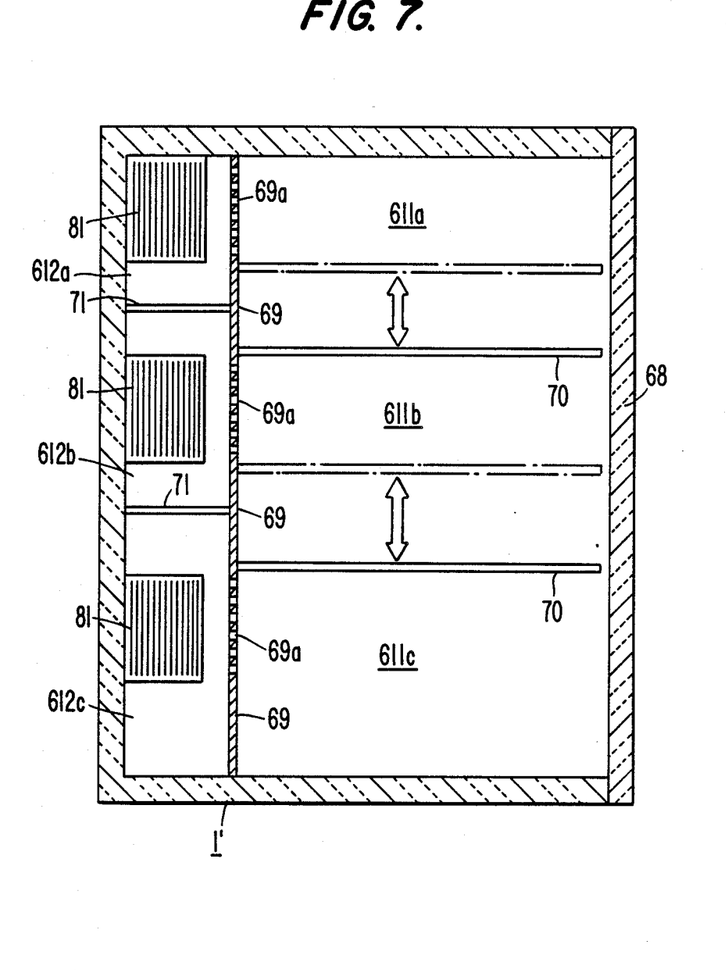
FIG. 7 is a cross-sectional view of the refrigerator of FIG. 6.

Referring to FIGS. 6 and 7 there is shown another embodiment of this invention in which the refrigerating apparatus 1' comprises a cabinet 60 with a storage chamber 61. The cabinet 60 is defined by an upper panel 62, a bottom panel 63, a rear panel 64 extending upwardly between the upper and bottom panels 62, 63 and a pair of side panels 65, 66 each of which is formed of insulation material. Storage chamber 61 has a front opening 67 for loading and unloading merchandise and normally closed by a hinged door 68. Storage chamber 61 is also divided vertically into two chambers, such as a front chamber 611 and a rear chamber 612 by a partition plate 69. Also, the front storage chamber 611 is divided horizontally into three spaces 611a, 611b, 611c by two shelves 70 which are mounted, preferably adjustably, in cabinet 60.

The rear chamber 612 of the storage chamber 61 is divided horizontally by separation plates 71 to form the same number of spaces 612a, 612b, 612c as that of the spaces 611a, 611b, 611c. The opposed spaces of the front chamber 611 and the rear chamber 612 are connected through a pair of holes 69a, 69b formed on the opposite side portions of the partition plate 69, i.e., the air in the space 611a of the front storage chamber 611 flows into the space 612a of the rear chamber 612 through one of the holes 69a formed on one side portion of the partition plate 69, and is returned to the space 611a through one of the holes 69b formed on the other end portion of the partition plate 69 after having passed through the space 612a. Therefore, with elements of the refrigerating unit, such as the evaporator 81 and the fan 82, disposed in the spaces 612a, 612b, 612c of the rear chamber 612 the air in each of the spaces 611a, 611b, 611c of the front storage chamber 611 is refrigerated. The air is circulated by the fan 82 through the evaporators 81.

In this embodiment of the apparatus, the amount of the refrigerant flowing in each of the evaporators 81 or the amount of air circulated by the fan 82 can be controlled to control independently the temperature in each of the spaces 611a, 611b, 611c. Also the evaporators 81 are parallel connected with one another, and are serially connected with the other parts or components of the refrigerating unit, such as the compressor and condenser (not shown). The compressor and condenser are to be carried on the vehicle with the compressor and the other control means for the refrigerating means operated by a power source of the vehicle, such as the engine or battery. Alternatively, almost all of the components of the refrigerating means may be disposed on the refrigerator 1' as with present refrigerators, and operated by the battery of the vehicle or by a commercial power source.

This invention has been described in detail in connection with the preferred embodiments. These embodiments, however, are merely illustrative and the present invention is not restricted thereto. It will be easily understood by those skilled in the air that other variations and modifications can be easily made, particularly in matters of size, shape and arrangement of the parts, which in the scope of this invention is defined by the broad general meaning of the terms in which the appended claims are expressed.

What is claimed is:

1. A refrigerator comprising:

a cabinet including a substantially planar bottom member and side members extending vertically therefrom, said cabinet further comprising storage chamber means for storing items to be refrigerated, said storage chamber means having a front opening and a normally closed door hingedly associated therewith to provide access to said storage chamber means, said storage chamber means also having at least one shelf extending between said side members and horizontally dividing said storage chamber means into at least two discrete storage spaces;

refrigeration means for refrigerating air, said refrigeration means comprising means for forcing circulation of said refrigerated air through at least two discrete air circulation paths; and at least two non-communicating discrete air flow conduits, each conduit being associated with a storage space and forming a portion of one of said circulation paths, each conduit being closed from an inlet to an outlet thereof and comprising means for directing said refrigerated air from said outlet to said inlet in a substantially horizontal path relative to said at least one shelf, wherein by controlling the temperature of air within each conduit, each storage space may be maintained at a different temperature.

2. The refrigerator of claim 1 wherein each of said shelves is adjustably mounted in said cabinet.

3. The refrigerator of claim 1 wherein said cabinet comprises an exterior cabinet and an interior cabinet which forms said storage chamber means, said interior cabinet being disposed in said exterior cabinet in spaced relation thereto and said air flow conduits being formed in the space between said interior and exterior cabinets.

4. The refrigerator of claim 3 wherein said refrigeration means is disposed in said air flow conduits.

5. The refrigerator of claim 4 wherein said refrigeration means includes at least two evaporator-fan pairs, each evaporator-fan pair being disposed in a discrete conduit.

6. The refrigerator of claim 4 wherein said refrigeration means includes an evaporator common to all of said conduits and a fan disposed in each of said conduits.

7. The refrigerator of claim 4 wherein said refrigeration means includes a fan common to all of said conduits and an evaporator disposed in each of said conduits.

8. The refrigerator of claim 4 wherein said refrigeration means includes an evaporator and a fan both of which are common to all of said conduits, and said conduits including damper means for independently controlling the amount of air passing through any one of said conduits.

9. The refrigerator of claim 1 wherein said air flow conduits are disposed at a rear portion of said cabinet and said refrigeration means is disposed in said air flow conduits.

10. The refrigerator of claim 1 wherein said directing means are positioned adjacent said front opening of the storage chamber to form discrete air curtains between the outlet and inlet of each circulation path and prevent fluid communication between the at least two storage spaces when said door is in an open position.

11. The refrigerator of claim 10 wherein said directing means comprises damper means for adjustably controlling the amount of air passing through each inlet and outlet.

12. The refrigerator of claim 11 wherein said damper means comprises a damper rotatably supported in each inlet.

13. The refrigerator of claim 11 wherein said damper means comprises a damper rotatably supported in each outlet.

14. The refrigerator of claim 11 wherein said damper means comprises a damper rotatably supported in said inlets and outlets.

15. A refrigerator comprising:
a cabinet including a substantially planar bottom member and side members extending vertically therefrom, said cabinet further comprising storage chamber means for storing items to be refrigerated, said storage chamber means having a front opening and a normally closed door hingedly associated therewith to provide access to said storage chamber means, said storage chamber means also having at least one shelf extending between said side members and horizontally dividing said storage chamber means into at least two discrete storage spaces;
refrigeration means for refrigerating air, said refrigeration means comprising means for forcing circulation of said refrigerated air through at least two discrete air circulation paths; and
at least two non-communicating discrete air flow conduits, each conduit being associated with a storage space and forming a portion of one of said circulation paths so that by controlling the temperature of air within each conduit, each storage space may be maintained at a different temperature, each conduit also being closed from an inlet to an outlet thereof and including means for directing said refrigerated air substantially only along an outer boundary of said storage means adjacent said front opening from the conduit outlet to the conduit inlet in a substantially horizontal path relative to said at least one shelf, thereby forming a discrete air curtain between each conduit outlet and inlet to prevent the incursion of warm air through said front opening into said discrete storage spaces when said door is pivoted to an open position.

16. The refrigerator of claim 15 wherein each of said shelves is adjustably mounted in said cabinet.

17. The refrigerator of claim 15 wherein said cabinet comprises an exterior cabinet and an interior cabinet which forms said storage chamber means, said interior cabinet being disposed in said exterior cabinet in spaced relation thereto and said air flow conduits being formed in the space between said interior and exterior cabinets.

18. The refrigerator of claim 17 wherein said refrigeration means is disposed in said air flow conduits.

19. The refrigerator of claim 18 wherein said refrigeration means includes at least two evaporator-fan pairs.

20. The refrigerator of claim 15 wherein said conduits include damper means for independently controlling the amount of air passing through any one of said conduits.

21. The refrigerator of claim 15 wherein said air flow conduits are disposed at a rear portion of said cabinet and said refrigeration means is disposed in said air flow conduits.

22. The refrigerator of claim 15 wherein said directing means are positioned adjacent said front opening of the storage chamber to form said discrete air curtains.

23. The refrigerator of claim 22 wherein said directing means comprise damper means for adjustably controlling the amount of air passing through each inlet and outlet.

24. The refrigerator of claim 22 wherein said damper means comprise a damper rotatably supported in each inlet.

25. The refrigerator of claim 22 wherein said damper means comprise a damper rotatably supported in each outlet.

26. The refrigerator of claim 22 wherein said damper means comprise a damper rotatably supported in said inlets and outlets.

* * * * *